Dec. 2, 1952     U. TORRICELLI     2,619,870
DISTORTION IMAGE DEVICE
Filed Nov. 30, 1950
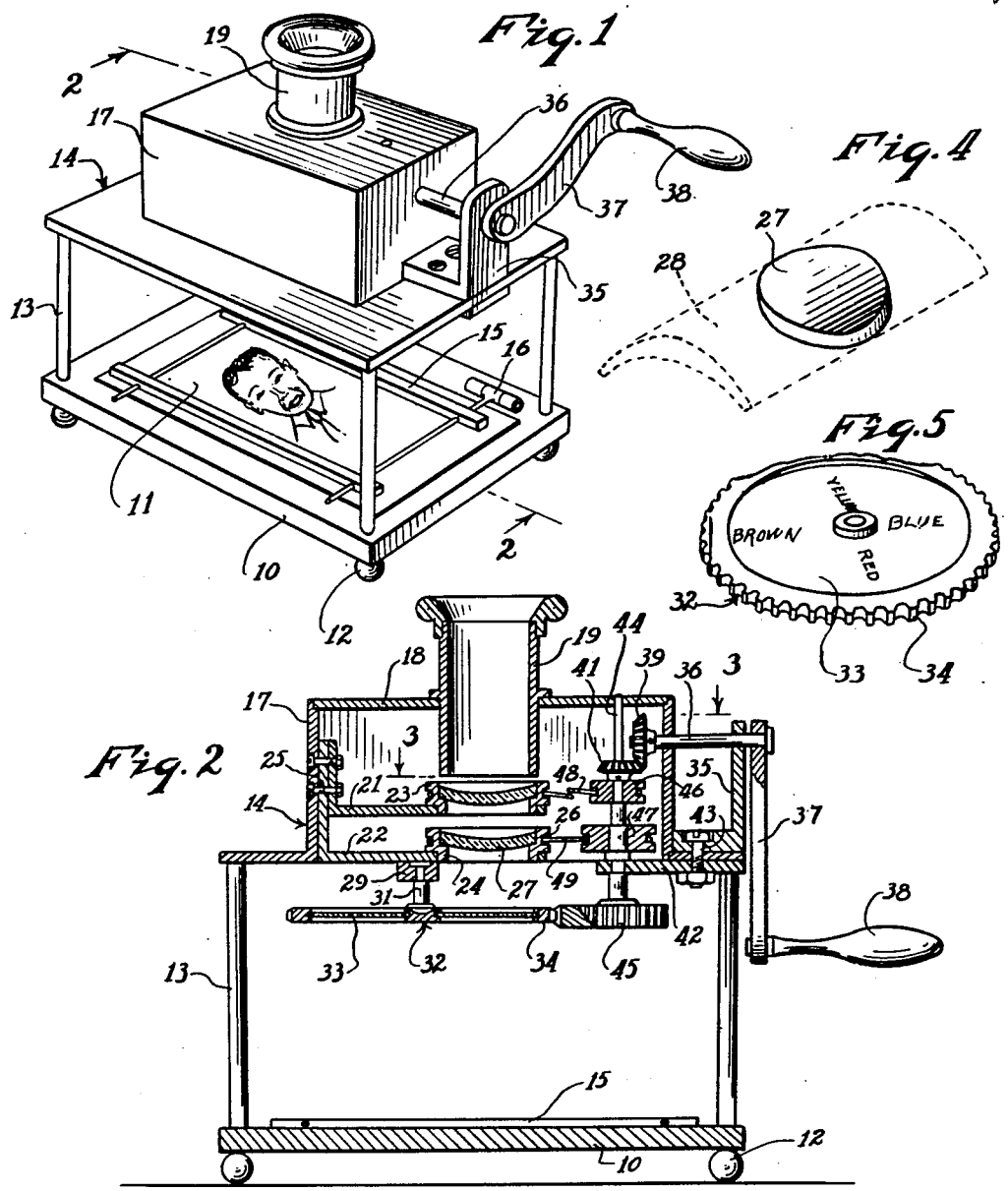
INVENTOR.
UGO TORRICELLI
BY
L. S. Saulsbury
ATTORNEY Patented Dec. 2, 1952

2,619,870

UNITED STATES PATENT OFFICE 2,619,870

DISTORTION IMAGE DEVICE

Ugo Torricelli, New York, N. Y., assignor to
Torricelli Creations, Inc., New York, N. Y.

Application November 30, 1950, Serial No. 198,407

1 Claim. (Cl. 88—1)

This invention relates to a distortion image device.

It is an object of the present invention to provide a distortion image device whereby upon the movement of vertically spaced lenses in rotation relative to one another, an object disposed thereon will be distorted to different shapes as the rotational movement of the specially formed lenses continues and wherein the movement is effected by a simple turning of a crank or other power device that can be conveniently mounted upon the frame structure of the device.

It is another object of the present invention to provide in connection with a distortion image device a color changing member which is rotated simultaneously with the rotation of the specially formed lenses so that a varying color will be given to the image as the same is being distorted.

Other objects of the present invention are to provide a distortion image device for effecting the rotation of specially formed lenses through which the image is observed, along with a color changing mechanism, which is of simple construction, inexpensive to manufacture, has a minimum number of parts, provides great amusement, compact, easy to operate and efficient in use.

For other objects and for a better understanding of the invention, reference may be had to the following detailed description taken in connection with the accompanying drawing, in which Fig. 1 is a perspective view of the distortion image device embodying the features of the present invention.

Fig. 2 is a longitudinal vertical sectional view of the device taken on line 2—2 of Fig. 1.

Fig. 3 is an enlarged transverse sectional view taken generally on line 3—3 of Fig. 2.

Fig. 4 is a perspective view of one of the lenses and illustrating the manner in which it is cut or formed.

Fig. 5 is a perspective view of the color changing disc.

Referring now to the figures, 10 represents a base or support on which a picture image 11 is supported. This base has ball seat portions 12 at the corners thereof. Also at the respective corners are vertically extending supports 13 for supporting a top structure 14 above the base 10. A hinged hold-down device 15 on the support 10 retains the picture image in a flat condition upon the support 10. This hold-down device 15 is hinged to the support 10, as indicated at 16.

The upper structure 14 includes a box-like wall portion 17 having a removable top piece 18 that supports an eye piece 19.

Fixed to one side of the box-like wall 17 are respectively vertically spaced brackets 21 and 22 that extend laterally inwardly and have respectively openings vertically aligned with one another and with the eye piece 19 for rotatably receiving respectively lens assemblies 23 and 24. These brackets 21 and 22 are made secure to the wall 17 by bolts 25.

Each of these lens assemblies 23 and 24 include a ring having a peripheral groove 26 and a specially formed lens 27. This lens, as shown in Fig. 4, is made from an arcuate section piece of glass cut from a cylinder. This arcuate section piece is illustrated in dotted lines in Fig. 4 at 28.

Depending from the under side of bracket 22 is a bearing projection 29 in which is fitted a stub shaft 31 carrying a color changing device 32 having a color changing ring 33. This device 32 has a gear ring 34 surrounding the color changing ring 33.

Extending upwardly from the structure 14 is a bracket 35 for supporting a drive shaft 36 which is also supported in the wall 17. This drive shaft has a crank 37 fixed thereto with a handle 38. The opposite end of the shaft has a bevel gear 39 that meshes with a bevel gear 41 fixed to a vertically extending shaft journalled in an inwardly extending bracket 42 that is held in place by bolt means 43 which fixes the bracket 35 to the frame structure 14. This shaft is indicated at 44 and depends through the bracket 42. On the lower end of the shaft is a gear 45 that meshes with the gear 34 of the color changing disc to effect the rotation of the same.

On the shaft 44 at corresponding elevations with the respective lens assemblies 23 and 24 are pulley members 46 and 47. A reverse pulley belt 48 extends between the pulley member 46 and the lens assembly 23 whereby to drive the lens assembly 23 in one direction. A pulley belt 49 is connected between the pulley member 47 and the lens assembly 24 to drive the same in the opposite direction from which the lens assembly 23 is driven.

In operation, the crank 37 is turned and the lens assemblies 23 and 24 are rotated in the reverse manner so that a double distortion of the image picture 11 is observed. While various changes may be made in the detail construction, it shall be understood that such changes shall be within the spirit and scope of the present invention as defined by the appended claim.

What is claimed is:

A distortion image device comprising a support and means thereon for retaining a picture image, a structure overlying said support and having vertically spaced brackets, lens assemblies respectively journalled in said brackets and overlying one another, an eye piece supported on the upper structure and vertically aligned with the lens assemblies, each of said lens assemblies including a ring having a groove and an unsymmetrical lens formed from an arcuate section piece cut from a cylinder, a drive mechanism including a shaft journalled in the upper structure and having respectively pulley members, pulley drive elements connected respectively between the pulley elements of the shaft and the grooves of the respective lens assemblies, one of said pulley drive elements being adapted to give reverse rotational movement of the lens assembly to which it is connected and means for rotating said shaft, said shaft having an extension depending from the upper structure and having a gear formation thereon, a rotatable color changing assembly supported on the upper structure for rotational movement and including a gear formation meshing with the gear formation of the shaft extension whereby automatically upon rotation of the shaft to rotate the lens assembly the color changing assemblies will be rotated.

UGO TORRICELLI.

REFERENCES CITED

The following references are of record in the file of this patent:

UNITED STATES PATENTS

| Number | Name | Date |
| --- | --- | --- |
| 1,002,483 | Baker | Sept. 5, 1911 |
| 1,201,813 | Fitzwilliam | Oct. 17, 1916 |
| 1,321,906 | Gehrmann | Nov. 18, 1919 |
| 2,377,476 | Berglund | June 5, 1945 |
| 2,427,870 | Mitchell | Sept. 23, 1947 |